United States Patent
Gu et al.

(10) Patent No.: US 10,788,914 B2
(45) Date of Patent: Sep. 29, 2020

(54) TOUCH PANEL, METHOD FOR DRIVING SAME AND TOUCH DISPLAY DEVICE

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Honggang Gu, Beijing (CN); Xianjie Shao, Beijing (CN); Jie Song, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 113 days.

(21) Appl. No.: 15/747,438

(22) PCT Filed: Jun. 29, 2017

(86) PCT No.: PCT/CN2017/090803
§ 371 (c)(1),
(2) Date: Jan. 24, 2018

(87) PCT Pub. No.: WO2018/001313
PCT Pub. Date: Jan. 4, 2018

(65) Prior Publication Data
US 2018/0224991 A1     Aug. 9, 2018

(51) Int. Cl.
*G06F 3/041*   (2006.01)
*G06F 3/044*   (2006.01)
(Continued)

(52) U.S. Cl.
CPC ............ *G06F 3/0414* (2013.01); *G06F 3/044* (2013.01); *G06F 2203/04103* (2013.01); *G06F 2203/04106* (2013.01)

(58) Field of Classification Search
CPC ............ H03K 17/9647; G02F 1/13338; G02F 1/013338; G06F 3/03545–3/045;
(Continued)

(56) References Cited

U.S. PATENT DOCUMENTS

2006/0109222 A1 * 5/2006 Lee .................. G02F 1/13338
345/88
2007/0195029 A1 * 8/2007 Jeon .................. G02F 1/13338
345/87
(Continued)

FOREIGN PATENT DOCUMENTS

CN       102236447 A  * 11/2011  ............. G06F 3/041
CN       102866813 A     1/2013
(Continued)

OTHER PUBLICATIONS

International Search Report and Written Opinion dated Oct. 13, 2017, for corresponding PCT Application No. PCT/CN2017/090803.
(Continued)

*Primary Examiner* — Lin Li
(74) *Attorney, Agent, or Firm* — Kinney & Lange, P.A.

(57) ABSTRACT

The touch panel according to embodiments of the present disclosure includes one or more first pressure detection electrodes and one or more second pressure detection electrodes, and one or more conductive connecting columns. When the touch panel is not touched, one or more connecting columns are in electrical contact with either the one or more first pressure detection electrodes or the one or more second pressure detection electrodes. When the touch pres-
(Continued)

sure is greater than a certain value, the touch panel is deformed, and both ends of the plurality of connecting columns are in electrical contact with both the one or more first pressure detection electrodes and the one or more second pressure detection electrodes, respectively.

20 Claims, 4 Drawing Sheets

(51) Int. Cl.
*H01H 13/702* (2006.01)
*G02F 1/1333* (2006.01)
*G06F 3/045* (2006.01)

(58) Field of Classification Search
CPC ... G06F 3/0416; G06F 1/0412–1/0416; H01H 13/702
See application file for complete search history.

(56) References Cited

U.S. PATENT DOCUMENTS

| | | | | |
|---|---|---|---|---|
| 2007/0262967 A1* | 11/2007 | Rho | ................... | G02F 1/13338 345/173 |
| 2008/0100590 A1* | 5/2008 | Hur | ...................... | G06F 3/0412 345/173 |
| 2008/0117182 A1* | 5/2008 | Um | ...................... | G06F 3/0412 345/173 |
| 2008/0122800 A1* | 5/2008 | Meng | ...................... | G06F 3/045 345/173 |
| 2009/0002312 A1* | 1/2009 | Son | ...................... | G06F 3/0412 345/104 |
| 2009/0174832 A1* | 7/2009 | Lee | ...................... | G02F 1/13338 349/43 |
| 2010/0079381 A1* | 4/2010 | Hayashi | ................ | G06F 3/0412 345/172 |
| 2010/0156827 A1* | 6/2010 | Joo | ..................... | G02F 1/13338 345/173 |
| 2013/0009653 A1* | 1/2013 | Fukushima | ............ | G06F 3/044 324/679 |
| 2013/0176235 A1 | 7/2013 | Chou et al. | | |
| 2014/0320445 A1* | 10/2014 | Kim | ....................... | G06F 3/044 345/174 |
| 2015/0114814 A1* | 4/2015 | Suzuki | ................. | H01H 13/702 200/5 A |
| 2015/0116073 A1* | 4/2015 | Suzuki | ................. | G06F 3/0414 338/47 |
| 2015/0268783 A1 | 9/2015 | Yoon et al. | | |
| 2016/0188082 A1* | 6/2016 | Ham | ..................... | G06F 3/0412 345/174 |
| 2016/0320908 A1* | 11/2016 | Yang | ..................... | G06F 3/0414 |
| 2017/0068368 A1* | 3/2017 | Hsiao | ..................... | G06F 3/044 |
| 2017/0192582 A1* | 7/2017 | Pan | ........................ | G06F 3/0412 |
| 2017/0228064 A1 | 8/2017 | Yao et al. | | |

FOREIGN PATENT DOCUMENTS

| | | | | |
|---|---|---|---|---|
| CN | 104503622 A | * | 4/2015 | ............. G06F 3/041 |
| CN | 104951124 A | | 9/2015 | |
| CN | 105607777 A | | 5/2016 | |
| CN | 105677126 A | | 6/2016 | |
| CN | 106201075 A | | 12/2016 | |
| KR | 20080045381 A | * | 5/2008 | ............. G06F 3/041 |

OTHER PUBLICATIONS

First Chinese Office Action dated Jun. 5, 2018, for corresponding Chinese Application No. 201610512302.6.

* cited by examiner

TOUCH PANEL, METHOD FOR DRIVING SAME AND TOUCH DISPLAY DEVICE

CROSS-REFERENCE TO RELATED APPLICATION

This application is the U.S. national phase of PCT Application No. PCT/CN2017/090803 filed on Jun. 29, 2017, which claims priority to Chinese Patent Application No. 201610512302.6 filed on Jun. 30, 2016, the disclosures of which are incorporated in their entirety by reference herein.

TECHNICAL FIELD

The present disclosure relates to the field of display technology, in particular to a touch panel, a method for driving the same, and a touch display device.

BACKGROUND

Touch screens have become increasingly common input devices due to their ease-of-use, versatility of operation and increasingly reduced prices with steadily improved yields. The touch screens can be classified into on-cell touch screens and in-cell touch screens. For an on-cell touch screen, a touch panel is assembled in front of a display screen with a touch region covering a visible region of the display screen, so as to achieve the touch sensing. For an in-cell touch screen, touch electrodes are integrated in the display panel with or without cover glass on an outer surface, and operations may be achieved by touching the screen by a user with one or more fingers.

Due to having the advantages of high sensitivity, long service life and support for multipoint touch, capacitive touch screens have become the mainstream of the current touch sensing technology. The capacitive touch screens are classified into self-capacitance touch screens and mutual-capacitance touch screens. Touch electrodes of a self-capacitance touch screen constitute capacitors relative to the ground, and if a finger touches the capacitive touch screen, it will result in a change in the capacitance at that touch point, whereby the touch position can be determined. Touch electrodes of a mutual-capacitance touch screen include driving electrodes and sensing electrodes, which constitute capacitors. If a finger touches the capacitive touch screen, it will result in a change in the capacitance at that touch point, whereby the touch position can be determined.

These touch screens can only achieve the judgment of the touch position, without the capability to detect the magnitude of the touch pressure, and thus cannot achieve the three-dimensional (3D) touch sensing and detection.

SUMMARY

In a first aspect, the present disclosure provides a touch panel, which includes a first substrate and a second substrate oppositely arranged to form a cell, and further includes one or more touch pressure detection electrodes configured to detect a magnitude of touch pressure and including one or more first pressure detection electrodes disposed on the first substrate and one or more second pressure detection electrodes disposed on the second substrate. The touch panel further includes a plurality of conductive connecting columns disposed between the first substrate and the second substrate and being in electrical contact with either the one or more first pressure detection electrodes or the one or more second pressure detection electrodes. And the touch panel is configured to detect the magnitude of the touch pressure applied to the touch panel, based on the number of the connecting columns which electrically connects the one or more first pressure detection electrodes with the one or more second pressure detection electrodes.

In a second aspect, the present disclosure further provides a touch display device including the touch panel as described above.

In a third aspect, the present disclosure further provides a method for driving the touch panel as described above, including: applying an excitation signal to the one or more first pressure detection electrodes of the touch panel in a first period of time, and detecting a magnitude of a signal on the one or more second pressure detection electrodes to determine the magnitude of the touch pressure based on the magnitude of the detected signal.

BRIEF DESCRIPTION OF THE DRAWINGS

In order to explain embodiments of the present disclosure or technical solutions in related art more clearly, drawings necessary for the description of the embodiments or the technical solutions in the related art will be briefly described below. Apparently, the described drawings are merely some of the embodiments of the present disclosure, and based on them, the other drawings may be obtained by persons having ordinary skills in the art, without creative work.

DETAILED DESCRIPTION

Specific embodiments of the present disclosure will be further described hereinafter in detail in conjunction with the drawings and examples. The following embodiments will be merely for illustrating the present disclosure, but not for limiting the scope of the present disclosure.

Figure 1:
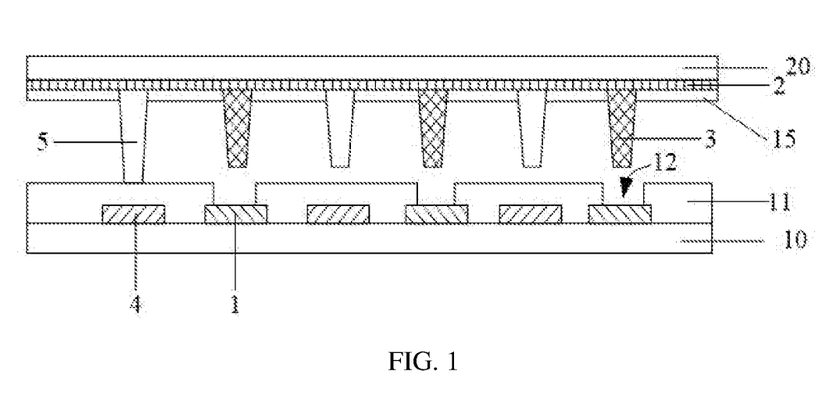
FIG. 1 shows a section view of a touch panel when it is not touched in some embodiments of the present disclosure.
Figure 2:
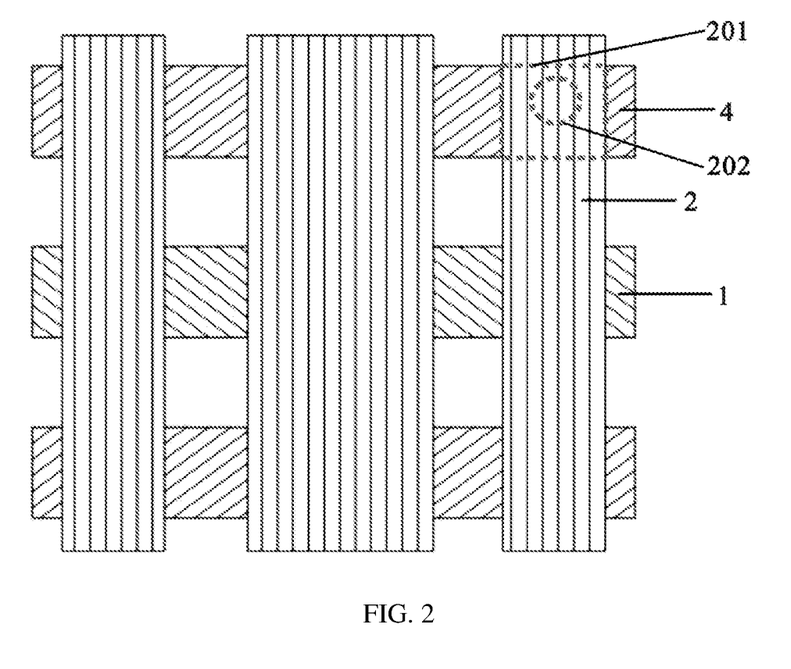
FIG. 2 shows a plan view of touch electrodes of a touch panel in some embodiments of the present disclosure.
Figure 3:
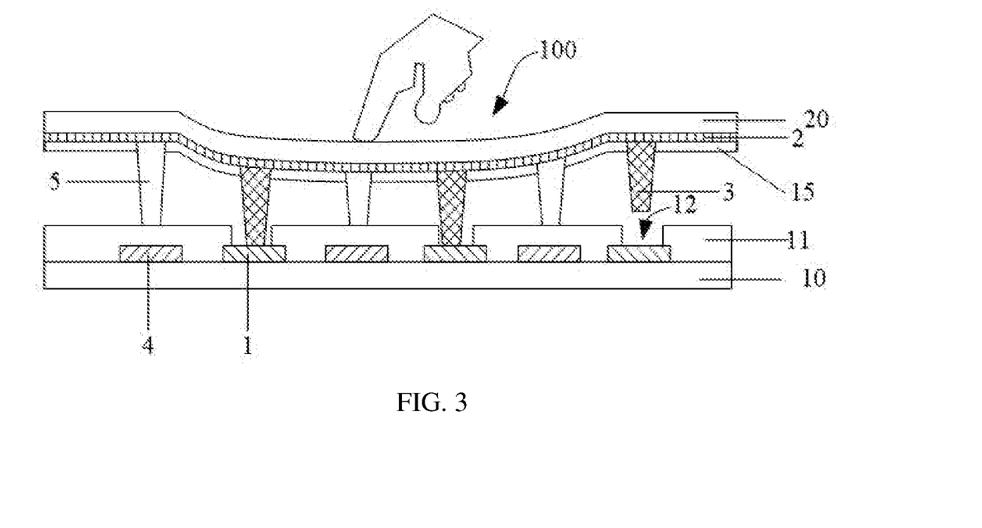
FIG. 3 shows a section view of a touch panel when it is touched in some embodiments of the present disclosure.

As shown in FIG. 1 through FIG. 3, in some embodiments of the present disclosure, there is provided a touch panel that includes a first substrate 10 and a second substrate 20 oppositely arranged to form a cell, and touch pressure detection electrodes configured to detect a magnitude of a touch pressure.

The touch pressure detection electrodes include one or more first pressure detection electrodes 1 and one or more second pressure detection electrodes 2. A plurality of conductive connecting columns 3 is provided between the first substrate 10 and the second substrate 20, and is in electrical contact with either the one or more first pressure detection electrodes 1 or the one or more second pressure detection electrodes 2. Specifically, the one or more first pressure detection electrodes 1 are arranged on the first substrate 10, and the one or more second pressure detection electrodes 2 are arranged on the second substrate 2. In the case of no touch input, each of the connecting columns is in electrical contact with only either the one or more first pressure detection electrodes 1 or the one or more second pressure detection electrodes 2. More specifically, as shown in FIG. 1, the connecting columns 3 are provided on the second substrate 20 and are in electrical contact with the second pressure detection electrodes 2, without being in electrical contact with the first pressure detection electrodes 1. The touch panel is configured to detect the magnitude of the touch pressure applied to the touch panel on the basis of the number of the connecting columns which electrically connect the one or more first pressure detection electrodes 1 with the one or more second pressure detection electrodes 2.

As shown in FIG. 3, a plurality of connecting columns 3 is in electrical contact with the second pressure detection electrode 2. When a touch pressure is applied to the touch panel, it is deformed and one ends of the plurality of connecting columns 3 are in electrical contact with the first pressure detection electrodes 1 and the other ends thereof are in electrical contact with the second pressure detection electrode 2. That is, the plurality of connecting columns 3 electrically connects the first pressure detection electrodes 1 with the second pressure detection electrode 2, as shown in FIG. 3. Different pressures correspond to different numbers of the connecting columns that achieve the connection of the first and second pressure detection electrodes, thus making it possible to achieve the detection of the touch pressure.

In the present disclosure, the magnitude of the touch pressure is detected based on the following principle. Namely the number of the connecting columns 3 that electrically connect the one or more first pressure detection electrodes 1 with the one or more second pressure detection electrodes 2 is proportional to the magnitude of the touch pressure. That is, the greater the touch pressure is, the greater the amount of deformation of the touch panel is, the more the connecting columns 3 that electrically connect the one or more first pressure detection electrodes 1 with the one or more second pressure detection electrodes 2 are, i.e., the greater the number of the connecting columns that achieve the connection between the one or more first pressure detection electrodes and the one or more second pressure detection electrodes. By applying an excitation signal to the one or more first pressure detection electrodes 1 and then detecting a signal on the one or more second pressure detection electrodes 2, it is possible to determine a magnitude of the touch pressure based on the magnitude of the detected signal. To be specific, in the case where a voltage is applied to the one or more first pressure detection electrodes 1, when a pressure is applied to the touch panel, the voltage applied to the one or more first pressure detection electrodes 1 will be applied to the one or more second pressure detection electrodes 2 via one or more connecting columns 3. In this case, the greater the number of the connecting columns that achieve the connection is, the smaller the equivalent resistance of the conduction circuit is, the greater the current detected on the one or more second pressure detection electrodes 2 is. Namely, the magnitude of the detected current is directly proportional to the number of the connecting columns that achieve the connection. For example, the detected current on the second pressure detection electrode 2 is $I_1$ when the number of the connecting columns 3 that achieve the connection is $n_1$, and the detected current on the second pressure detection electrode 2 is $I_2$ when the number of the connecting columns 3 that achieve the connection is $n_2$, where $n_1$ and $n_2$ are positive integers greater than one, if $n_1$ is less than $n_2$, $I_1$ is less than $I_2$. Therefore, the technical solutions of the present disclosure can achieve the determination of the magnitude of the touch pressure on the basis of the magnitude of the detected signal. Furthermore, it is also possible to grade the touch pressure according to the magnitude of the detected signal on the one or more second pressure detection electrodes 2, and different levels of touch pressure correspond to different operations.

The touch panel of the present disclosure can achieve quick detection of the magnitude of the touch pressure, and has a simple structure which is easy to implement, and relatively low production cost.

The detected signal on the second pressure detection electrode may be in the form of voltage, current or the like, and is not defined herein so long as the detection of the magnitude of the pressure can be achieved on the basis of the detected signal.

Optionally, the plurality of connecting columns 3 is evenly distributed. When the same pressure is applied by a finger to different regions on the touch panel, it is possible to determine that the touch pressures in the different regions of the touch panel are the same.

Figure 7:
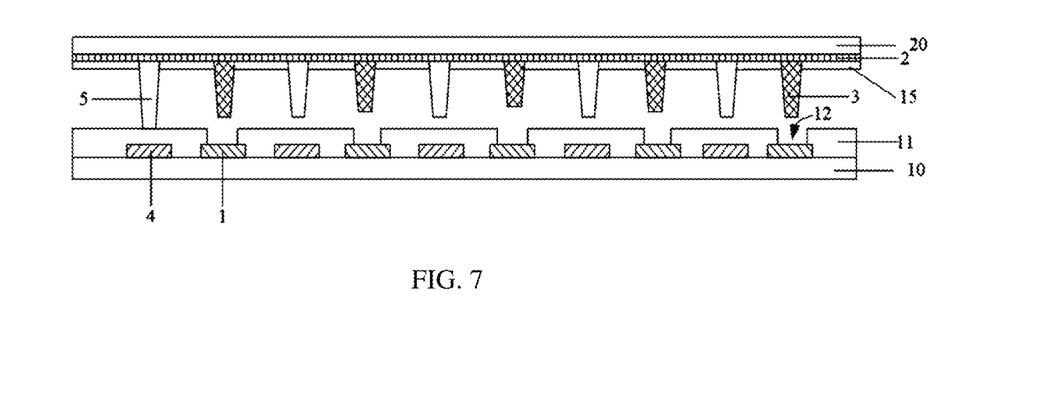
FIG. 7 shows a section view of a touch panel when it is not touched in some embodiments of the present disclosure, where heights of the one or more auxiliary spacers gradually increase in a direction away from a center region of the first substrate or the second substrate to both ends of the first substrate or the second substrate.

Further, it is possible to provide a plurality of connecting columns 3 having exactly the same height in a direction perpendicular to both the first substrate 10 and the second substrate 20. When any region on the touch panel is subjected to the same touch pressure, detection signals obtained are the same and the detection is uniformized. Of course, it is also possible to arrange at least two connecting columns 3 having different heights. For example, in a predetermined region of the touch panel which will be subjected to a touch pressure, at least two connecting columns 3 are provided to have different heights. Specifically, the heights of the connecting columns 3 gradually increase in a direction away from a center of the predetermined region, so that under the same pressure, it is possible to increase the number of the connecting columns 3 that achieve the connection, increase the detected signal and improve the sensitivity of detection, as compared with the case where the plurality of connecting columns 3 in the predetermined region are arranged to have the same height. FIG. 7 shows a section view of a touch panel when it is not touched in some embodiments of the present disclosure, where heights of the one or more auxiliary spacers 3 gradually increase in a direction away from a center region of the first substrate 10 or the second substrate 20 to both ends of the first substrate 10 or the second substrate 20. In other words, the more distal an auxiliary spacer 3 is away from the center of the first substrate 10 or the second substrate 20, the taller the auxiliary spacer 3 itself is relative to an auxiliary spacer 3 located at the center of the first substrate 10 or the second substrate 20.

In some embodiments of the present disclosure, one or more orthographic projections of the one or more first pressure detection electrodes 1 on the first substrate 10 have one or more overlapping regions with one or more orthographic projections of the one or more second pressure detection electrodes 2 on the first substrate 10, and the connecting columns 3 are arranged corresponding to the one or more overlapping regions. When the touch panel is deformed, the plurality of connecting columns 3 in a deformation region 100 electrically connects the one or more first pressure detection electrodes 1 with the one or more second pressure detection electrodes 2, which directly reflects the amount of the deformation caused by the touch pressure. Moreover, as shown in FIG. 3, such arrangement facilitates the uniform distribution of the connecting columns 3, thereby improving the accuracy and precision of detection. Specifically, a plurality of evenly distributed overlapping regions may be formed. Of course, it is also possible to form one overlapping region which covers the entire touch panel. In other words, both the first pressure detection electrode 1 and the second pressure detection electrode 2 are each a plate-shaped electrode that covers an area where the touch panel is located. When the touch panel is subjected to a pressure, the voltage on the first pressure detection electrode 1 is applied to the second pressure detection electrode 2 via one or more connecting columns 3. The greater the number of the connecting columns 3 that achieve the connection is, the larger the detected current on the second pressure detection electrode 2 is. That is, the magnitude of the detected current is directly proportional to the number of the connecting columns 3 that achieve the connection.

In some embodiments of the present disclosure, as shown in FIG. 1 and FIG. 2, the first pressure detection electrodes 1 and the second pressure detection electrodes 2 are strip-shaped electrodes, the touch pressure detection electrodes include a plurality of first pressure detection electrodes 1 distributed substantially parallel to each other and a plurality of second pressure detection electrodes 2 distributed substantially parallel to each other. And orthographic projections of the first pressure detection electrodes 1 on the first substrate 10 form a plurality of overlapping regions with orthographic projections of the second pressure detection electrodes 2 on the first substrate 10. Due to the low requirement for the sensitivity of the touch detection, it is not necessary to arrange the overlapping regions in such a way to cover the entire touch panel, so as to reduce the consumption of material and cost. Optionally, the plurality of overlapping regions is evenly distributed so as to facilitate the effective detection of the touch pressure of the entire touch panel. Moreover, when a finger touches different regions of the touch panel with the same pressure, it is possible to determine that the magnitudes of the touch pressure in the different regions are the same.

Figure 6A:
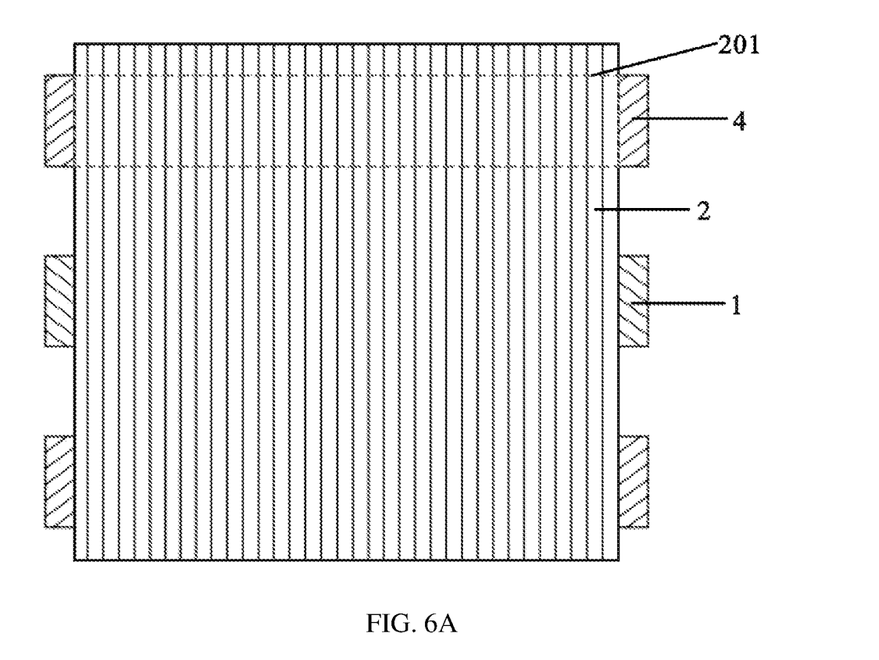
FIG. 6A shows a first plan view of touch electrodes of a touch panel in some embodiments of the present disclosure, in which orthographic projections of the one or more first pressure detection electrodes and the one or more second pressure detection electrodes on the first substrate have complete overlapping regions.
Figure 6B:
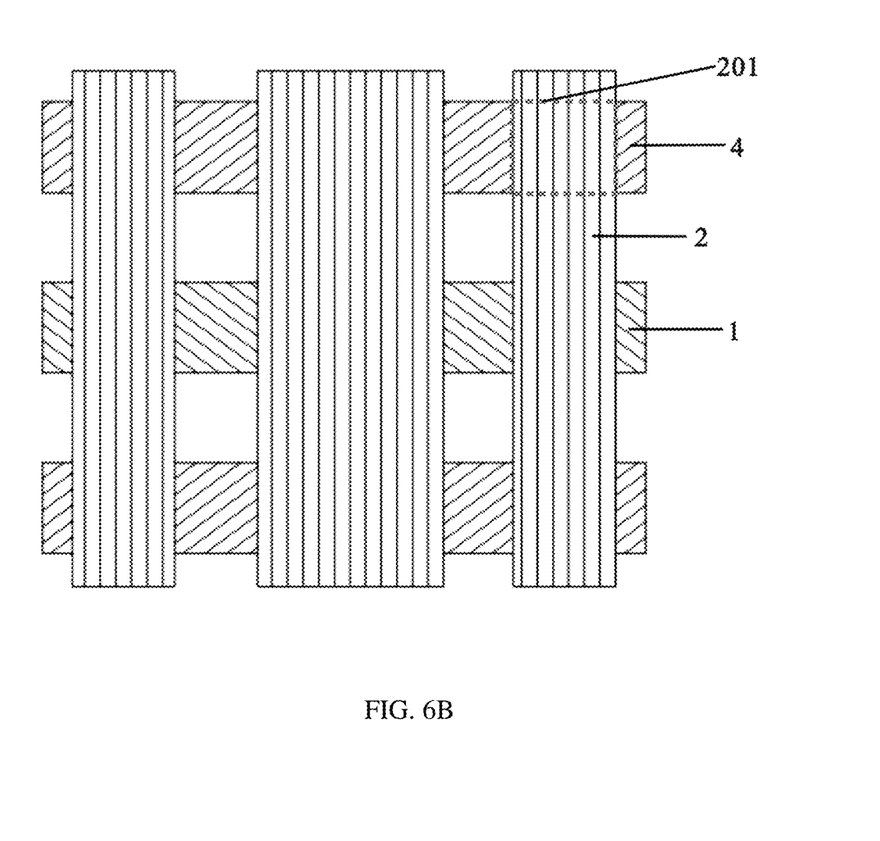
FIG. 6B shows a second plan view of touch electrodes of a touch panel in some embodiments of the present disclosure, in which orthographic projections of the one or more first pressure detection electrodes and the one or more second pressure detection electrodes on the first substrate have partial overlapping regions.

Further, a plurality of first pressure detection electrodes 1 and a plurality of second pressure detection electrodes 2 which are crosswise distributed may be arranged, as shown in FIG. 2. Alternatively, the first pressure detection electrodes 1 may also be arranged parallel to the second pressure detection electrodes 2. Optionally, positions of the first pressure detection electrodes 1 and those of the second pressure detection electrodes 2 are in one-to-one correspondence. Here, as shown in FIG. 6A and FIG. 6B respectively, the correspondence of position means that a projection area of one of the first pressure detection electrodes 1 on a plane where the touch panel is located partially (when there are a plurality of second pressure detection electrodes 2, the plurality of second pressure detection electrodes 2 are arranged in a crosswise manner relative to all first pressure detection electrodes 1, as shown by 201 in FIG. 6B) or completely (when there is only one second pressure detection electrode 2, the one second pressure detection electrode 2 is of a plate-like shape and covers all first pressure detection electrodes 1, as shown by 201 in FIG. 6A) overlaps another projection area of a corresponding one of the second pressure detection electrodes 2 on the plane where the touch panel is located, or that the position of one of the first pressure detection electrodes 1 corresponds to the positions of at least two of the second pressure detection electrodes 2, or that the position of one of the second pressure detection electrodes 2 corresponds to the positions of at least two of the first pressure detection electrodes 1.

In order to simultaneously achieve the detection of the touch position, in some embodiments of the present disclosure, the touch panel further includes one or more first touch electrodes to detect one or more touch positions. The one or more first touch electrode may achieve the detection of the touch position in a manner of forming a surface capacitance or projected capacitance. For the type of surface capacitance, the first touch electrode is a monolithic plated-shaped electrode, and when it is energized, a uniform electric field will be formed on its surface. When a finger touches the touch panel, since a human body is a conductor, it will absorb part of the current, resulting in a change in the electric field on the surface of the first touch electrode, whereby a controller may capture and calculate the touched position. For the type of projected capacitance, the touch panel further includes one or more second touch electrodes, and a projection capacitance is generated between the one or more first touch electrodes and the one or more second touch electrodes for the touch detection. The one or more second touch electrodes may be one or more electrodes provided separately, or the existing one or more electrodes may be directly used as the one or more second touch electrodes. There are two types of projected capacitive touch panel. Namely, self-capacitance and mutual capacitance. As shown in FIG. 2, the second pressure detection electrodes 2 may be also directly used as the second touch electrodes. In this way, the second pressure detection electrodes 2 and the first touch electrodes 4 are crosswise distributed for the detection of the touch position. By simultaneously using the second pressure detection electrode 2 as another touch electrode for the detection of the touch position, it is possible to simplify the manufacturing process. The one or more first touch electrodes 4 may be arranged on the first substrate 10 or on the second substrate 20. Optionally, the one or more first touch electrodes 4 are arranged on the first substrate 10. Since the one or more second pressure detection electrodes 2 are arranged on the second substrate 20, it is not necessary to provide a separate insulating layer to achieve the insulation between the one or more second pressure detection electrodes 2 and the one or more first touch electrodes 4. In a specific structure, the second pressure detection electrode 2 and the first touch electrode 4 are both strip-shaped electrodes, the touch panel includes a plurality of the second pressure detection electrodes 2 distributed parallel to each other and a plurality of the first touch electrodes 4 distributed parallel to each other, and the plurality of the second pressure detection electrodes 2 and the plurality of the first touch electrodes 4 are crosswise distributed. It shall be noted that the shapes of the second pressure detection electrodes 2 and the first touch electrodes 4 are not limited to the strip shape, and may be other regular shapes such as diamond, or other irregular shapes, which are not limited herein.

Specifically, the detection of the touch position may be achieved by means of self-capacitance or mutual-capacitance. For the type of self-capacitance, the one or more second pressure detection electrodes 2 and the one or more first touch electrodes 4 constitute capacitors with the ground, respectively. This kind of capacitor is commonly referred to as a self-capacitor, that is, the capacitor of an electrode relative to ground. When a finger touches the touch panel, a finger capacitor will be superimposed on the panel capacitor, resulting in an increase in the capacitance of the panel. When performing the touch detection, the one or more second pressure detection electrodes 2 and the one or more first touch electrodes 4 are detected separately and sequentially, and based on changes in the capacitance before and after the touch, a horizontal coordinate and a vertical coordinate are determined respectively, which are then combined to form a plane coordinate of the touch, thereby determining the touch position. For the type of mutual capacitance, a second pressure detection electrode 2 and a first touch electrode 4 form a mutual capacitor at their crossing area. When a finger touches the touch panel, the coupling between the two electrodes near the touch point is affected, resulting in a change in the capacitance between the two electrodes. When detecting the mutual capacitance, an excitation signal may be sent to the one or more second pressure detection electrodes 2 sequentially, and the one or more first touch electrodes 4 receive the signal. When the mutual capacitance changes, the horizontal coordinate and the vertical coordinate can be determined, thereby determining the touch position.

In the embodiments of the present disclosure, by using the mutual capacitance to detect the touch position, it is possible to achieve multi-point detection without ghost points. Moreover, the second pressure detection electrode 2 is also used as another touch electrode for detecting the touch position. Further, when one or more first touch electrodes 4 are disposed on the first substrate 10, the one or more first pressure detection electrodes 1 may be also provided to be one or more strip-shaped electrodes, and one or more orthographic projections of the one or more first touch electrodes 4 and that or those of the one or more first pressure detection electrodes 1 on the first substrate 10 are spaced from each other without overlapping regions, so that the detection of the touch position and the detection of the touch pressure do not affect each other adversely. Optionally, the one or more first touch electrodes 4 and the one or more first pressure detection electrodes 1 are arranged in the same layer, thereby further simplifying the manufacturing process.

In addition, for a surface-capacitance touch electrode, the touch panel in some embodiments of the present disclosure may be provided with only one monolithic plate-shaped surface-capacitance touch electrode (i.e., a first touch electrode) without the need to provide the first and second pressure detection electrodes. When the first touch electrode is energized, a uniform electric field will be formed on its surface. When a finger touches the touch panel, since a human body is a conductor, it will absorb part of the current to result in a change in the electric field on the surface of the first touch electrode, whereby the touch position can be captured and calculated by a controller.

The touch panel in some embodiments of the present disclosure may be externally attached on a display panel. Alternatively, the touch electrodes may be embedded inside a display panel, such as a liquid crystal display (LCD) panel, an organic light emitting diode (OLED) display panel or the like, to form a touch display panel, which merely requires the addition of the touch electrodes and the collecting columns inside the display panel. In order to add the touch electrodes and the connecting columns, those skilled in the art can easily contemplate that the other structures of the display panel may be adjusted accordingly without affecting the implementation of the present disclosure.

Taking the touch electrode embedded inside the liquid crystal display panel as an example, the touch display panel further includes one or more auxiliary spacers disposed between the first substrate 10 and the second substrate 20. The one or more auxiliary spacers are conductive spacers and also used as the connecting columns 3. Specifically, conductive particles may be added to the one or more auxiliary spacers, or a conductive layer may be formed on the surface of each of the one or more auxiliary spacers to form a conductive spacer. By using the one or more conductive auxiliary spacer as the connecting columns 3 at the same time, there may be no need to add a separate manufacturing process to form the connecting columns 3, thereby simplifying the manufacturing process. Optionally, a plurality of auxiliary spacers which are also used as the connecting columns 3 have the same height in the direction perpendicular to the first substrate 10 and the second substrate 20, and when any area of the touch display panel receives the same touch pressure, detection signals obtained are the same and the uniformizaiton of the detection is achieved. Of course, it is also possible to provide at least two auxiliary spacers 3 having different heights. For example, in a predetermined region of the touch display panel which will be subjected to a touch pressure, at least two auxiliary spacers 3 are provided to have different heights. Specifically, the heights of the auxiliary spacers 3 gradually increase in a direction away from a center of the predetermined region, so that under the same pressure, it is possible to increase the number of the auxiliary spacers 3 that achieve the connection, increase the detected signal and improve the sensitivity of detection, as compared with the case where the plurality of auxiliary spacers 3 in the predetermined region are arranged to have the same height.

Further, the auxiliary spacers 3 may be disposed on the second substrate 20 and in electrical contact with the second pressure detection electrodes 2. The one or more first pressure detection electrodes 1 are covered with a first alignment film 11 on their surface. The first alignment film 11 has via holes 12 at positions corresponding to the auxiliary spacers 3. As shown in FIG. 3, when the touch display panel is deformed, the plurality of auxiliary spacers 3 in a deformation area 100 can be inserted into the via holes 12 to make electrical contact with the one or more first pressure detection electrodes 1, thereby electrically connecting the one or more first pressure detection electrodes 1 with the one or more second pressure detection electrodes 2. Furthermore, the greater the touch pressure is, the larger the amount of deformation of the touch display panel is, the greater the number of the auxiliary spacers 3 that electrically connect the one or more first pressure detection electrodes 1 with the one or more second pressure detection electrodes 2 is. When detecting the magnitude of the touch pressure, an excitation signal is applied to the one or more first pressure detection electrodes 1, a signal on the one or more second pressure detection electrodes 2 is detected, and the magnitude of the touch pressure is determined based on the magnitude of the detected signal. Specifically, the touch pressure may be graded according to the magnitude of the detected signal on the one or more second pressure detection electrodes 2, and different levels of touch pressure correspond to different operations.

The touch electrodes in some embodiments of the present disclosure are made of a transparent conductive material, such as indium zinc oxide (IZO) or indium tin oxide (ITO), so as not to affect the display.

Figure 4:
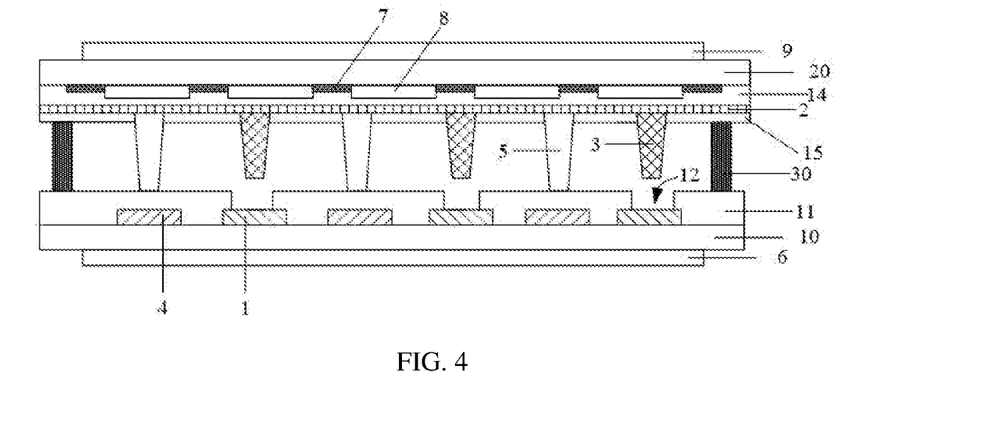
FIG. 4 shows a section view of a touch display panel in some embodiments of the present disclosure.

As shown in FIG. 4, when the touch electrodes are embedded into the liquid crystal display panel to form a touch display panel, the touch display panel includes:

a first substrate 10 and a second substrate 20 oppositely arranged to form a cell, wherein a sealant 30 is provided between the first substrate 10 and the second substrate 20 and located in a non-display region such that a sealed space is formed between the first substrate 10 and the second substrate 20;

liquid crystal filled in the sealed space;

a lower polarizer 6 disposed on a lower surface of the first substrate 10;

a plurality of first pressure detection electrodes 1 distributed parallel to each other and a plurality of first touch electrodes 4 distributed parallel to each other, provided on an upper surface of the first substrate 10, the first pressure detection electrodes 1 being parallel to and spaced from the first touch electrodes 4;

a first alignment film 11 covering the first pressure detection electrodes 1 and the first touch electrodes 4 and having a plurality of via holes 12 evenly distributed, wherein each of the via holes 12 is located in a region where each of the first pressure detection electrodes 1 is located for exposing a portion of the first pressure detection electrode 1;

display films disposed on the upper surface of the first substrate 10, which will not be elaborated here (please refer to the related art);

an upper polarizer 9 disposed on an upper surface of the second substrate 20;

a black matrix 7 disposed on a lower surface of the second substrate 20 for defining a plurality of sub-pixel regions;

a filter layer 8 disposed in the sub-pixel regions, which may include a red filter layer, a green filter layer, and a blue filter layer;

a planarization layer 14 covering the black matrix 7 and the filter layer 8;

a plurality of parallel second pressure detection electrodes 2 disposed on the planarization layer 14, the second pressure detection electrodes 2 and the first pressure detection electrodes 1 and the first touch electrodes 4 being crosswise distributed;

a second alignment film 15 covering the second pressure detection electrodes 2; and one or more main spacers 5 and one or more conductive auxiliary spacers 3 disposed on the second alignment film 15, wherein the one or more main spacers 5 and the one or more auxiliary spacers 3 are of the same layer structure and in electrical contact with the second pressure detection electrodes 2 through the via holes in the second alignment film 15.

It should be noted that "upper" and "lower" in the upper surface and the lower surface of the first substrate 10 and in the upper surface and the lower surface of the second substrate 20 refer to directions schematically shown in FIG. 4, which are merely for convenience of description, but not for limitation.

Based on the same inventive concept, some embodiments of the present disclosure further provide a method for manufacturing the touch panel as described above. The method includes steps of: providing a first substrate and a second substrate oppositely arranged to form a cell, and forming one or more touch pressure detection electrodes to detect a magnitude of a touch pressure.

The step of forming the one or more touch pressure detection electrodes includes: forming one or more first pressure detection electrodes on the first substrate, and forming one or more second pressure detection electrodes on the second substrate.

The method further includes forming a plurality of conductive connecting columns on the first substrate or the second substrate. And these conductive connecting columns are in electrical contact with either the one or more first pressure detection electrodes or the one or more second pressure detection electrodes. The number of the connecting columns the electrically connect the one or more first pressure detection electrodes with the one or more second pressure detection electrodes varies with the touch pressure applied to the touch panel.

With the touch panel formed through the above steps, by applying an excitation signal to the one or more first pressure detection electrodes and detecting the magnitude of a signal on the one or more second pressure detection electrodes, it is possible to achieve the determination of the magnitude of the touch pressure. The manufacturing process of the touch panel is simple and easy to implement, and the production cost is relatively low.

In some embodiments of the present disclosure, one or more orthographic projections of the one or more first pressure detection electrodes on the first substrate have one or more overlapping regions with one or more orthographic projections of the one or more second pressure detection electrodes on the first substrate, and the connecting columns are provided corresponding to the one or more overlapping regions of the orthographic projections of the one or more first pressure detection electrodes and the one or more second pressure detection electrodes. Therefore, as shown in FIG. 2, orthographic projections 202 of the connecting columns 3 on the first substrate 10 are located in the one or more overlapping regions 201 of the one or more first pressure detection electrodes 1 and the one or more second pressure detection electrodes 2 respectively. When the touch panel is deformed, the plurality of connecting columns in a deformation region electrically connects the one or more first pressure detection electrodes with the one or more second pressure detection electrodes, which directly reflects the magnitude of the deformation caused by the touch pressure. Furthermore, such arrangement facilitates the uniform distribution of the connecting columns, thereby improving the precision and accuracy of detection. The overlapping regions may cover the entire touch panel, or a plurality of overlapping regions evenly distributed may be formed.

Further, the step of forming the one or more first pressure detection electrodes on the first substrate includes forming on the first substrate a plurality of strip-shaped first pressure detection electrodes distributed parallel to each other.

The step of forming the one or more second pressure detection electrodes on the second substrate includes forming on the second substrate a plurality of strip-shaped second pressure detection electrodes distributed parallel to each other.

The first pressure detection electrodes and the second pressure detection electrodes formed through the above steps are both strip-shaped electrodes and orthographic projections of the first pressure detection electrodes on the first substrate and those of the second pressure detection electrode on the first substrate have overlapping regions. Due to the low requirement for the sensitivity of the touch detection, it is not necessary to arrange the overlapping regions to cover the entire touch panel, thus reducing the consumption of material and cost. Optionally, a plurality of evenly-distributed overlapping regions is formed for the detection of the touch pressure of the entire touch panel.

In order to achieve the detection of the touch position at the same time, the manufacturing method in some embodiments of the present disclosure further includes forming one or more first touch electrodes for detecting one or more touch positions.

The one or more first touch electrodes may achieve the detection of the touch position in a manner of forming a surface capacitance or projected capacitance. Among them, there are two types of projected capacitive touch panel. Namely, self-capacitance and mutual capacitance. Due to the existence of ghost points, the self-capacitance cannot achieve multi-point detection, but the mutual capacitance can achieve single-point and multi-point detection. The one or more first touch electrodes in some embodiments of the present disclosure realize the detection of the touch position by forming a mutual capacitance.

In order to achieve mutual-capacitive touch detection, optionally, the method includes: forming on the first substrate a plurality of strip-shaped first touch electrodes distributed parallel to each other; and forming on the second substrate a plurality of strip-shaped second pressure detection electrodes distributed parallel to each other, wherein the plurality of first touch electrodes and the plurality of second pressure detection electrodes are crosswise distributed.

The first touch electrodes and the second pressure detection electrodes obtained through the above manufacturing method form a mutual capacitance array at their overlapping portions for the detection of the touch position. Since each of the second pressure detection electrodes is also used as a touch electrode for detecting the touch pressure, the manufacturing process can be simplified and the production cost can be reduced.

The touch panel obtained in some embodiments of the present disclosure may be externally attached on a display panel. Alternatively, the touch electrodes may be embedded in a display panel to form a touch display panel, which merely requires the addition of the touch electrodes and the connecting columns inside the display panel. In order to form the touch electrodes and the connecting columns, those skilled in the art can easily contemplate that the other structures of the display panel may be adjusted accordingly without adversely affecting the implementation of the present disclosure.

Taking the touch electrodes embedded into the liquid crystal display panel to form the touch display panel as an example, the method further includes: forming one or more main spacers and one or more auxiliary spacers between the first substrate and the second substrate; and adding conductive particles to the one or more auxiliary spacers such that the one or more auxiliary spacers are also used as connecting columns.

In the above steps, the one or more auxiliary spacers of the display panel are also used as the connecting columns. Therefore, no separate manufacturing process is required to form the connecting columns, thus simplifying the manufacturing process.

Of course, the one or more auxiliary spacers may also be made conductive to be also used as the connecting columns by forming a conductive layer on the surface of each of the one or more the auxiliary spacers.

Further, more specifically, the one or more auxiliary spacers are formed on the second substrate, and the one or more auxiliary spacers are in electrical contact with the second pressure detection electrodes. The method further includes: forming a first alignment film covering the first pressure detection electrodes; and forming via holes in the first alignment film at positions corresponding to the one or more auxiliary spacers. When the touch panel is deformed, a plurality of auxiliary spacers in a deformation region can be inserted into the via holes to be in electrical contact with the first pressure detection electrodes, that is, the first pressure detection electrodes are electrically connected with the second pressure detection electrodes. Moreover, the greater the touch pressure is, the larger the deformation occurs in the touch display panel, the greater the number of the auxiliary spacers which electrically connect the first pressure detection electrodes with the second pressure detection electrodes is. When detecting the magnitude of the touch pressure, an excitation signal is applied to the first pressure detection electrodes, a signal of the second pressure detection electrodes is detected, and the magnitude of the touch pressure can be determined based on the magnitude of the detected signal. Specifically, the touch pressure may be graded according to the magnitude of the detected signal on the second pressure detection electrodes, and different levels of touch pressure correspond to different operations.

Some embodiments of the present disclosure provide a touch display device that includes the touch panel as described above, and a controller configured to apply an excitation signal to the one or more first pressure detection electrodes of the touch panel in a first period of time and detect a magnitude of a detection signal on the one or more second pressure detection electrodes to determine the magnitude of the touch pressure based on the magnitude of the detection signal.

The magnitude of the signal on the one or more second pressure detection electrodes is directly proportional to the magnitude of the touch pressure applied to the touch panel.

The touch display device can achieve the determination of the magnitude of the touch pressure by applying an excitation signal to the one or more first pressure detection electrodes and detecting a magnitude of the signal on the one or more second pressure detection electrodes. Therefore, the control is simple, and the sensitivity and accuracy of detection are high.

In order to simultaneously detect the touch position, the touch panel in some embodiments of the present disclosure further includes one or more first touch electrodes for detecting one or more touch positions.

Further, the one or more first touch electrodes are disposed on the first substrate, the one or more second pressure detection electrodes are disposed on the second substrate, and the one or more second pressure detection electrodes and the one or more first touch electrodes are crosswise distributed to form a mutual capacitance array is formed at their crossing portion. It is thus able to realize the detection of the touch position by means of mutual capacitance. Since the second pressure detection electrode is also used as one touch electrode for detecting the magnitude of the touch pressure, the controller is further configured to apply another excitation signal to the one or more first touch electrodes sequentially in a second period of time and detect a sensing signal on the one or more second pressure detection electrodes, so as to determine whether the touch panel is touched or not and the touch position, based on the magnitude of the sensing signal.

Based on the same inventive concept, some embodiments of the present disclosure further provide a method for driving the touch panel as described above, which includes: applying an excitation signal to the one or more first pressure detection electrodes of the touch panel in a first period of time, and detecting a magnitude of a detection signal on the one or more second pressure detection electrodes to determine the magnitude of the touch pressure based on the magnitude of the detection signal.

The magnitude of the detection signal on the second pressure detection electrodes is directly proportional to the magnitude of the touch pressure applied to the touch panel.

The driving method can determine the magnitude of the touch pressure by applying an excitation signal to the one or more first pressure detection electrodes and detecting the magnitude of the detection signal on the one or more second pressure detection electrodes. Thus, the control method is simple, and the sensitivity and accuracy of detection are high.

Further, the touch panel further includes one or more first touch electrodes, the one or more second pressure detection electrodes and the one or more first touch electrodes are crosswise distributed. The driving method further includes: applying another excitation signal to the one or more first touch electrodes of the touch panel sequentially in a second period of time which has no overlap with the first period of time, and detecting a sensing signal on the one or more second pressure detection electrodes to determine whether the touch panel is touched or not and a touch position based on a magnitude of the sensing signal. Herein, the second period of time has no overlap with the first period of time refers to an instance where the first period of time is immediately followed by the second period of time in time sequence, or another instance where the first period of time is followed by the second period of time in time sequence with a certain interval therebetween.

Figure 5:
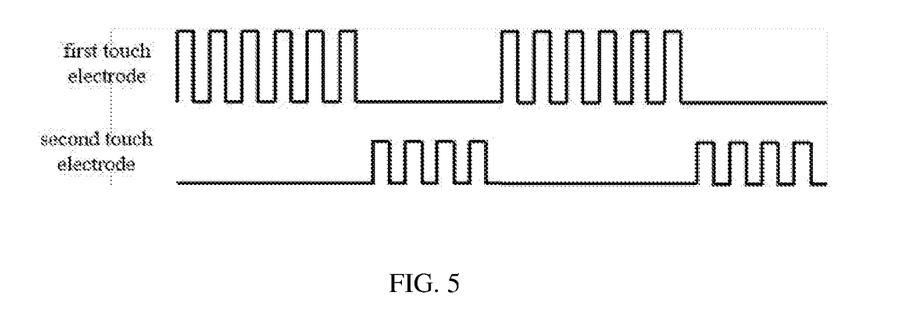
FIG. 5 shows a timing chart of a method for driving a touch display panel in some embodiments of the present disclosure.

In the above driving method, the second pressure detection electrode is also used as one touch electrode for detecting the touch position. FIG. 5 shows a timing chart of the driving method.

As shown in FIG. 1 and FIG. 3, a specific driving process of the touch display device in some embodiments of the present disclosure is given as follows.

One or more first pressure detection electrodes 1 and one or more first touch electrodes 4 are driving electrodes disposed on the first substrate 10; one or more conductive auxiliary spacers 3 and one or more second pressure detection electrodes 2 are disposed on the second substrate 20, and the one or more auxiliary spacers 3 are in electrical contact with the one or more second pressure detection electrodes 2; when an excitation signal is applied to the one or more first pressure detection electrodes 1, no excitation signal is applied to the one or more first touch electrodes 4; and when no excitation is applied to the one or more first pressure detection electrodes 1, an excitation signal is applied to the one or more first touch electrodes 4.

As shown in FIG. 1, when a finger is in a state of not applying pressure, since the second substrate 20 has no obvious deformation, the one ore more auxiliary spacers 3 only make electrical contact with the one or more second pressure detection electrodes 2. The detection of the touch position can be achieved by means of the one or more second pressure detection electrodes 2 and the one or more first touch electrodes 4.

As shown in FIG. 3, when a finger presses the second substrate 20, the second substrate 20 will have obvious deformation, and the one or more auxiliary spacers 3 in a deformation area 100 passes through the via holes 12 in the first alignment film 11 to be in electrical contact with a corresponding one or more first pressure detection electrodes 1. As a result, the excitation signal on the one or more first pressure detection electrodes 1 is applied to the one or more second pressure detection electrodes 2 through the one or more auxiliary spacers 3. In addition, when the finger presses the second substrate 20 with a different pressure, there will be a difference in the deformation of the second substrate 20. As a result, the number of the auxiliary spacers 3 electrically connecting the one or more second pressure detection electrodes 2 with the one or more first pressure detection electrodes 1 is also different, thereby resulting in a difference in the detection signal on the one or more second pressure detection electrodes 2. Based on the difference of the detection signal, the touch pressure can be graded and the level of the touch pressure can be determined. The detection signal on the one or more second pressure detection electrodes 2 may be in the form of voltage, current or the like.

The above are merely some embodiments of the present disclosure, and it should be noted that those having ordinary skills in the art may make several improvements and replacements without departing from the technical principles of the present disclosure. Such improvements and replacements should also be regarded as falling within the scope of protection of the present disclosure.

What is claimed is:

1. A touch panel, comprising a first substrate and a second substrate oppositely arranged to form a cell, and further comprising one or more touch pressure detection electrodes configured to detect a magnitude of touch pressure, wherein the one or more touch pressure detection electrodes comprise:
   one or more first pressure detection electrodes disposed on the first substrate; and
   one or more second pressure detection electrodes disposed on the second substrate;
   wherein the touch panel further comprises: one or more first touch electrodes disposed on the first substrate and configured to detect one or more touch positions; and a plurality of conductive connecting columns disposed between the first substrate and the second substrate and being in electrical contact with either the one or more first pressure detection electrodes or the one or more second pressure detection electrodes;
   wherein the touch panel is configured to detect the magnitude of the touch pressure applied to the touch panel, based on a number of the connecting columns which electrically connect the one or more first pressure detection electrodes with the one or more second pressure detection electrodes;
   wherein the one or more first pressure detection electrodes and the one or more first touch electrodes are disposed on one same layer and distributed alternately with a gap therebetween;
   wherein the one or more second pressure detection electrodes and the one or more first touch electrodes are crosswise distributed to generate detection capacitances at crossing regions between the one or more second pressure detection electrodes and the one or more first touch electrodes;
   wherein the one or more touch positions are determined by detecting whether the detection capacitances change or not;
   wherein the touch panel further comprises one or more main spacers and one or more auxiliary spacers disposed between the first substrate and the second substrate;
   wherein the one or more first pressure detection electrodes are covered with an alignment film on their surfaces and the alignment film has via holes at positions corresponding to the one or more auxiliary spacers, and when the touch panel is deformed, the one or more auxiliary spacers within a deformation region of the touch panel pass through the via holes to be in electrical contact with the one or more first pressure detection electrodes;

wherein heights of the one or more auxiliary spacers gradually increase in a direction away from a center region of the first substrate or the second substrate to both ends of the first substrate or the second substrate; and wherein each of orthographic projections of the one or more main spacers and the one or more auxiliary spacers on the first substrate falls within the one or more first pressure detection electrodes and the one or more first touch electrodes respectively.

2. The touch panel according to claim 1, wherein orthographic projections of the one or more first pressure detection electrodes onto the first substrate and orthographic projections of the one or more second pressure detection electrodes onto the first substrate have one or more overlapping regions; and wherein orthographic projections of the connecting columns onto the first substrate are located in the one or more overlapping regions of the one or more first pressure detection electrodes and the one or more second pressure detection electrodes.

3. The touch panel according to claim 2, wherein the one or more first pressure detection electrodes and the one or more second pressure detection electrodes are strip-shaped electrodes; and wherein the one or more touch pressure detection electrodes comprise a plurality of first pressure detection electrodes distributed substantially parallel to each other and a plurality of second pressure detection electrodes distributed substantially parallel to each other.

4. The touch panel according to claim 3, wherein the plurality of first pressure detection electrodes and the plurality of second pressure electrodes are crosswise distributed.

5. The touch panel according to claim 2, wherein orthographic projections of the one or more first pressure detection electrodes and the one or more second pressure detection electrodes onto the first substrate have partial or complete overlapping regions.

6. The touch panel according to claim 1, wherein orthographic projections of the one or more first touch electrodes onto the first substrate and orthographic projections of the one or more first pressure detection electrodes onto the first substrate are spaced from each other.

7. The touch panel according to claim 1, wherein the plurality of connecting columns is evenly distributed.

8. The touch panel according to claim 1,
wherein the one or more auxiliary spacers are conductive spacers and also used as the connecting columns.

9. The touch panel according to claim 8, wherein the one or more auxiliary spacers are disposed on the second substrate and configured to be in electrical contact with the one or more second pressure detection electrodes.

10. The touch panel according to claim 9, wherein the via holes correspond to orthographic projection regions of the one or more auxiliary spacers onto the alignment film, and each of the via holes exposes a part of each of the one or more first pressure detection electrodes.

11. The touch panel according to claim 1, wherein at least two of the connecting columns have different heights.

12. The touch panel according to claim 1, wherein the one or more connecting columns extend for approximately a same distance from the second substrate towards the first substrate in a direction perpendicular to the second substrate.

13. The touch panel according to claim 1, wherein at least two of the one or more connecting columns extend for substantially different distances from the second substrate towards the first substrate in a direction perpendicular to the second substrate.

14. The touch panel according to claim 1, wherein the one or more main spacers and the plurality of conductive connecting columns are distributed alternately with a gap therebetween.

15. The touch panel according to claim 14, wherein in a direction perpendicular to the first substrate and the second substrate, at least two main spacers among the one or more main spacers are substantially different in their heights.

16. The touch panel according to claim 14, wherein in a direction perpendicular to the first substrate and the second substrate, the one or more main spacers are substantially the same in their heights, and the plurality of conductive connecting columns are substantially the same in their heights but substantially lower than the heights of the one or more main spacers.

17. The touch panel according to claim 14, wherein orthographic projections of the one or more main spacers and the one or more first touch electrodes onto the first substrate have partial or complete overlapping regions.

18. A touch display device, comprising:
a touch panel, comprising a first substrate and a second substrate oppositely arranged to form a cell, and further comprising one or more touch pressure detection electrodes configured to detect a magnitude of touch pressure, wherein the one or more touch pressure detection electrodes comprise:
one or more first pressure detection electrodes disposed on the first substrate; and
one or more second pressure detection electrodes disposed on the second substrate;
wherein the touch panel further comprises: one or more first touch electrodes disposed on the first substrate and configured to detect one or more touch positions; and a plurality of conductive connecting columns disposed between the first substrate and the second substrate and being in electrical contact with either the one or more first pressure detection electrodes or the one or more second pressure detection electrodes;
wherein the touch panel is configured to detect the magnitude of the touch pressure applied to the touch panel, based on a number of connecting columns which electrically connect the one or more first pressure detection electrodes with the one or more second pressure detection electrodes;
wherein the one or more first pressure detection electrodes and the one or more first touch electrodes are disposed on one same layer and distributed alternately with a gap therebetween;
wherein the one or more second pressure detection electrodes and the one or more first touch electrodes are crosswise distributed to generate detection capacitances at crossing regions between the one or more second pressure detection electrodes and the one or more first touch electrodes;
wherein the one or more touch positions are determined by detecting whether the detection capacitances change or not;

wherein the touch panel further comprises one or more main spacers and one or more auxiliary spacers disposed between the first substrate and the second substrate;

wherein the one or more first pressure detection electrodes are covered with an alignment film on their surfaces and the alignment film has via holes at positions corresponding to the one or more auxiliary spacers, and when the touch panel is deformed, the one or more auxiliary spacers within a deformation region of the touch panel pass through the via holes to be in electrical contact with the one or more first pressure detection electrodes;

wherein heights of the one or more auxiliary spacers gradually increase in a direction away from a center region of the first substrate or the second substrate to both ends of the first substrate or the second substrate; and wherein each of orthographic projections of the one or more main spacers and the one or more auxiliary spacers on the first substrate falls within the one or more first pressure detection electrodes and the one or more first touch electrodes respectively.

19. A method for driving a touch panel comprising a first substrate and a second substrate oppositely arranged to form a cell, and further comprising one or more touch pressure detection electrodes configured to detect a magnitude of touch pressure, wherein the one or more touch pressure detection electrodes comprise:

one or more first pressure detection electrodes disposed on the first substrate; and one or more second pressure detection electrodes disposed on the second substrate;

wherein the touch panel further comprises: one or more first touch electrodes disposed on the first substrate and configured to detect one or more touch positions; and a plurality of conductive connecting columns disposed between the first substrate and the second substrate and being in electrical contact with either the one or more first pressure detection electrodes or the one or more second pressure detection electrodes;

wherein the touch panel is configured to detect the magnitude of the touch pressure applied to the touch panel, based on a number of the connecting columns which electrically connect the one or more first pressure detection electrodes with the one or more second pressure detection electrodes, wherein the one or more first pressure detection electrodes and the one or more first touch electrodes are disposed on one same layer and distributed alternately with a gap therebetween;

wherein the one or more second pressure detection electrodes and the one or more first touch electrodes are crosswise distributed to generate detection capacitances at crossing regions between the one or more second pressure detection electrodes and the one or more first touch electrodes;

wherein the one or more touch positions are determined by detecting whether the detection capacitances change or not;

wherein the touch panel further comprises one or more main spacers and one or more auxiliary spacers disposed between the first substrate and the second substrate;

wherein the one or more first pressure detection electrodes are covered with an alignment film on their surfaces and the alignment film has via holes at positions corresponding to the one or more auxiliary spacers, and when the touch panel is deformed, the one or more auxiliary spacers within a deformation region of the touch panel pass through the via holes to be in electrical contact with the one or more first pressure detection electrodes;

wherein heights of the one or more auxiliary spacers gradually increase in a direction away from a center region of the first substrate or the second substrate to both ends of the first substrate or the second substrate; and wherein each of orthographic projections of the one or more main spacers and the one or more auxiliary spacers on the first substrate falls within the one or more first pressure detection electrodes and the one or more first touch electrodes respectively, the method comprising:

applying an excitation signal to the one or more first pressure detection electrodes of the touch panel in a first period of time, and detecting a magnitude of a detection signal on the one or more second pressure detection electrodes to determine the magnitude of the touch pressure based on the magnitude of the detection signal.

20. The method according to claim 19, wherein the touch panel comprises one or more first touch electrodes, and the one or more second pressure detection electrodes and the one or more first touch electrodes are crosswise distributed, the method further comprising:

applying another excitation signal to the one or more first touch electrodes of the touch panel sequentially in a second period of time which has no overlap with the first period of time, and detecting a sensing signal on the one or more second pressure detection electrodes to determine whether the touch panel is touched or not and a touch position based on a magnitude of the sensing signal.

* * * * *

UNITED STATES PATENT AND TRADEMARK OFFICE
CERTIFICATE OF CORRECTION

| | | |
|---|---|---|
| PATENT NO. | : 10,788,914 B2 | Page 1 of 1 |
| APPLICATION NO. | : 15/747438 | |
| DATED | : September 29, 2020 | |
| INVENTOR(S) | : Honggang Gu, Xianjie Shao and Jie Song | |

It is certified that error appears in the above-identified patent and that said Letters Patent is hereby corrected as shown below:

On the Title Page

Item (30), under Foreign Application Priority Data:
Insert -- June 30, 2016 (CN) 201610512302.6 --

Signed and Sealed this
First Day of June, 2021

Drew Hirshfeld
*Performing the Functions and Duties of the
Under Secretary of Commerce for Intellectual Property and
Director of the United States Patent and Trademark Office*